United States Patent
Khouri et al.

Patent Number: 6,072,806
Date of Patent: Jun. 6, 2000

[54] MESSAGE-BASED COMMUNICATION SYSTEM

[75] Inventors: Felix F. Khouri, San Jose; Mahesh Bommareddy, Milpitas, both of Calif.

[73] Assignee: Aspect Telecommunications Corporation, San Jose, Calif.

[21] Appl. No.: 08/850,200

[22] Filed: May 2, 1997

[51] Int. Cl.$^7$ .................................................. G06F 13/38
[52] U.S. Cl. ........................ 370/465; 370/401; 370/228
[58] Field of Search ........................... 370/297, 401, 370/407, 422, 425, 465, 466, 469, 225, 228, 400, 423; 709/201, 203; 340/825.01

[56] References Cited

U.S. PATENT DOCUMENTS

| | | | |
|---|---|---|---|
| 5,001,710 | 3/1991 | Gawrys et al. | 370/110.1 |
| 5,161,153 | 11/1992 | Westmore | 370/407 |
| 5,287,103 | 2/1994 | Kasprzyk et al. | 370/401 |
| 5,377,191 | 12/1994 | Farrell et al. | 370/401 |
| 5,406,557 | 4/1995 | Baudoin | 370/401 |
| 5,491,693 | 2/1996 | Britton et al. | 370/401 |
| 5,623,605 | 4/1997 | Keshav et al. | 395/200.17 |
| 5,734,656 | 3/1998 | Prince et al. | 370/401 |
| 5,740,231 | 4/1998 | Cohn et al. | 379/89 |
| 5,778,178 | 8/1996 | Arunachalam | 395/200.33 |
| 5,802,053 | 9/1998 | Bollella et al. | 370/401 |
| 5,884,032 | 3/1999 | Bateman et al. | 395/200.34 |

*Primary Examiner*—Ricky Ngo
*Attorney, Agent, or Firm*—Blakely, Sokoloff, Taylor & Zafman LLP

[57] ABSTRACT

A message-based communication system includes a communication link having an associated message version. A first device is coupled to the communication link. The first device is configured to communicate messages across the communication link using the message version associated with the communication link. A second device is also coupled to the communication link. The second device is configured to communicate messages across the communication link using any of several different message versions. A message version controller is also coupled to the communication link. The second device includes a link status database that is used to store information regarding communication links coupled to the second device.

14 Claims, 9 Drawing Sheets

LINK STATUS TABLE

| PORT NO. | LINK VER. | REDUNDANT LINK(S) | LINK DESCRIPTION | PROTOCOL PHYSICAL LINK | BAUD RATE | PARITY | DATA BITS | STOP BITS |
|---|---|---|---|---|---|---|---|---|
| 1 | 1.1 | 2 | APPLICATION 1 | | 9600 | Y | 8 | 1 |
| 2 | 1.1 | 1 | APPLICATION 1 | | 9600 | Y | 8 | 1 |
| 3 | 1.2 | 4 | APPLICATION 2 | | 9600 | N | 8 | 1 |
| 4 | 1.2 | 3 | APPLICATION 2 | | 9600 | N | 8 | 1 |
| 5 | 2.0 | 6 | APPLICATION A | | 19200 | Y | 8 | 1 |
| 6 | 2.0 | 5 | APPLICATION A | | 19200 | Y | 8 | 1 |
| 7 | 2.0 | -- | APPLICATION B | | 19200 | Y | 8 | 1 |
| 8 | 1.2 | 9, 10 | APPLICATION C | | 19200 | N | 8 | 1 |
| 9 | 1.2 | 8, 10 | APPLICATION C | | 19200 | N | 8 | 1 |
| 10 | 1.2 | 8, 9 | APPLICATION C | | 19200 | N | 8 | 1 |

FIG. 3A

LINK STATUS TABLE

| PORT NO. | LINK VER. | REDUNDANT LINK(S) | LINK DESCRIPTION | PROTOCOL PHYSICAL LINK | BAUD RATE | PARITY | DATA BITS | STOP BITS |
|---|---|---|---|---|---|---|---|---|
| 1 | 1.1 | 3,4 | APPLICATION 1 | | 9600 | Y | 8 | 1 |
| 2 | 1.1 | 4,3 | APPLICATION 1 | | 9600 | Y | 8 | 1 |
| 3 | 1.2 | 1,2 | APPLICATION 2 | | 9600 | N | 8 | 1 |
| 4 | 1.2 | 2,1 | APPLICATION 2 | | 9600 | N | 8 | 1 |
| 5 | 2.0 | 7,8 | APPLICATION A | | 19200 | Y | 8 | 1 |
| 6 | 2.0 | 9,7 | APPLICATION A | | 19200 | Y | 8 | 1 |
| 7 | 2.0 | 5,8,10 | APPLICATION B | | 19200 | Y | 8 | 1 |
| 8 | 1.2 | 5,7 | APPLICATION C | | 19200 | N | 8 | 1 |
| 9 | 1.2 | 6,7,10 | APPLICATION C | | 19200 | N | 8 | 1 |
| 10 | 1.2 | 5,8 | APPLICATION C | | 19200 | N | 8 | 1 |

FIG. 3B

MESSAGE-BASED COMMUNICATION SYSTEM

FIELD OF THE INVENTION

The present invention relates to data communication systems. More specifically, the present invention provides a message-based communication system capable of transmitting messages having different message versions between various devices in the communication system.

BACKGROUND

Various types of communication systems are available in which devices communicate across one or more communication links. Typically, each device coupled to a particular communication link communicates data across the communication link using the same protocol or type of message. The type of message refers to the protocol, data format, or a particular set of messages. Generally, when one of the devices is revised or upgraded to a different type of message, then the other devices coupled to the same communication link must also be revised or upgraded to maintain compatibility among all devices coupled to the communication link.

Communication systems may provide redundant communication links between multiple devices. In these systems, the devices coupled to the redundant communication link typically use the same type of message to communicate data among the devices. If one of the devices is changed to a different type of message, then the other devices coupled to the redundant communication link are also changed to maintain compatibility. Additionally, if one of the devices coupled to a primary communication link is changed to a different type of message, then the devices coupled to the redundant communication link are also changed to maintain compatibility among all devices coupled to the primary communication link as well as the redundant communication link.

Certain communication systems include a single device (such as a server) coupled to multiple devices (or nodes) using multiple communication links. Typically, these systems require that the server and each node coupled to the server use the same type of message to communicate information across the multiple communication links. Thus, if the message type of the server or any node is changed, the other nodes and/or the server message type must be changed to maintain compatibility.

In certain situations, a user or system administrator may want to change the type of message used with particular devices without changing the type of message used with other devices. For example, a system administrator may desire the additional features or functionality provided by a different type of message for a few devices, but does not need the added features in the remaining devices. In existing systems that require the same type of message for all devices, the system administrator must purchase and install the new type of message for all devices, even though the new version is not required for all of the devices.

It is therefore desirable to provide a message-based communication system that is capable of communicating multiple types of messages between different devices in a communication system.

SUMMARY OF THE INVENTION

Embodiments of the present invention are related to a message-based communication system capable of transmitting messages having different message versions between various components or devices in the communication system. A particular message version is associated with each communication link in the message-based communication system. Messages transmitted across a particular communication link correspond to the message version associated with that link. A particular communication link may be a primary communication link having one or more redundant communication links. Thus, the present invention does not require that all devices in a particular communication system utilize the same message version.

In one embodiment of the invention, a communication link has an associated message version. A first device is coupled to the communication link and is configured to communicate messages across the communication link using the message version associated with the communication link. A second device is also coupled to the communication link and is configured to communicate messages across the communication link using any of several different message versions.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 3A and 3B illustrate embodiments of a Link Status Table containing information regarding various communication links in a communication system.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention is related to a message-based communication system capable of transmitting messages having different message versions between various components or devices in the communication system. A message may contain any type of data or information to be communicated between two or more devices. The data or information contained in the message may be arranged in any format and can be transmitted using any data transmission protocol. Furthermore, different messages may contain different types of data, arranged in different formats, and transmitted using different protocols.

A particular message version is associated with each communication link in the message-based communication system. Messages transmitted across a particular communication link correspond to the message version associated with that link. A particular communication link may be a primary communication link having one or more redundant (or backup) communication links. In this situation, the primary communication link and the redundant communication link may have different associated message versions.

Figure 1:
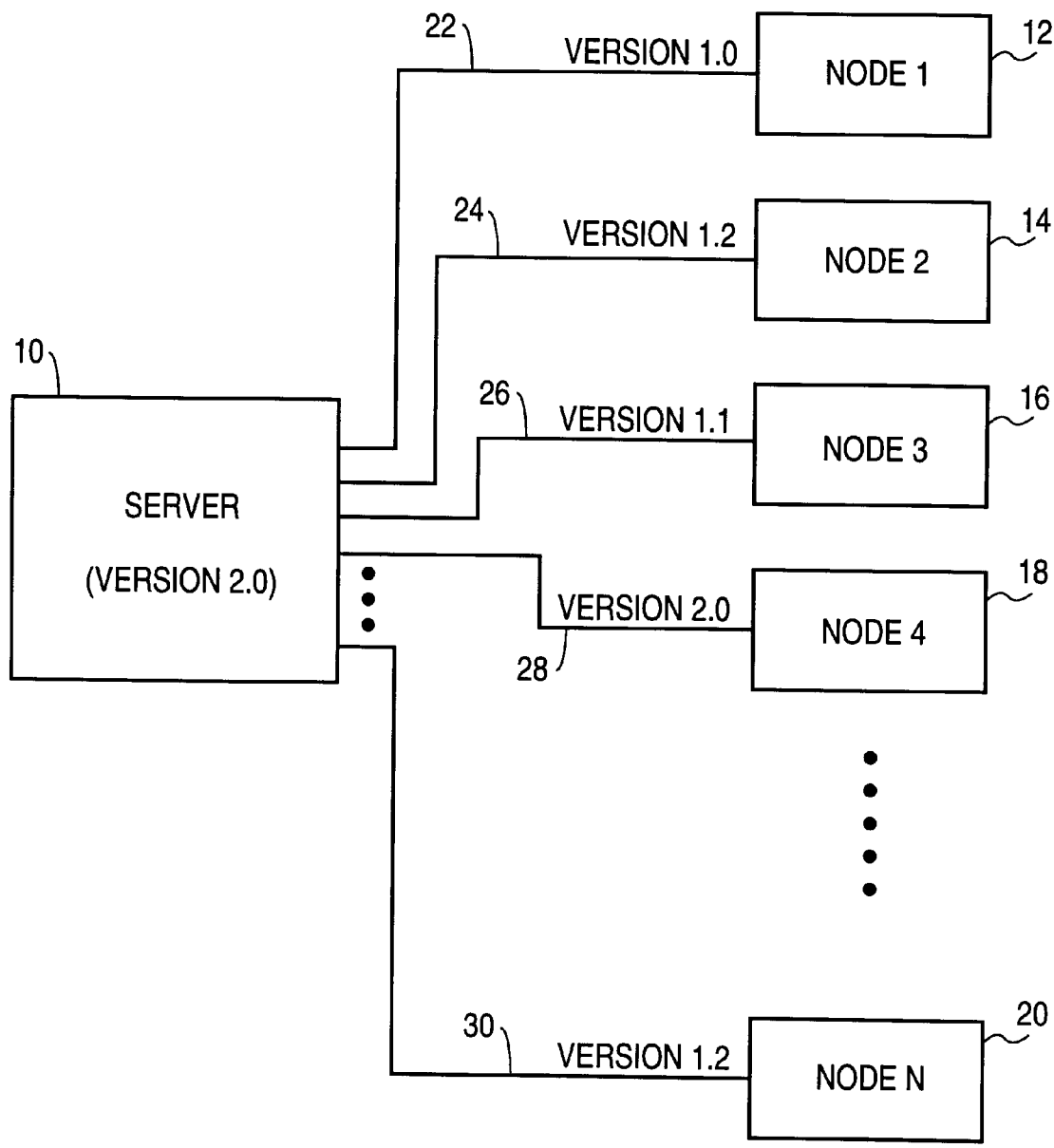
FIG. 1 illustrates an embodiment of a server coupled to multiple nodes.

FIG. 1 illustrates an embodiment of a server 10 coupled to multiple nodes 12, 14, 16, 18, and 20. A separate communication link is coupled between server 10 and each node 12–20. Each communication link has an associated message version. The message version may identify a particular protocol used to communicate messages between server 10 and nodes 12–20. Alternatively, the message version may define a particular format used to communicate information contained in messages between server 10 and nodes 12–20. Furthermore, the message version may identify a particular set of messages or a particular message type that is communicated across the communication link. The message type may refer to various message features or message attributes that are associated with the messages being transmitted across the communication link. Different message versions may provide different messages or different functions performed by similar messages. For example, in a first message version, a "Save" message can perform a particular type of "Save" operation. In a second message version, the "Save" message includes additional functionality that allows the "Save" message to perform several types of "Save" operations (e.g., saving all information or saving information having a particular attribute).

In a particular embodiment of the invention, "message version" refers to a particular set of messages (including message attributes and other information) transmitted between server 10 and nodes 12–20. Different nodes may be implementing different software or message communication versions such that each node generates a particular set of messages associated with the software being implemented on the node. For example, node 12 may be operating software that is capable of transmitting and receiving messages having a message version 1.0. Thus, a communication link 22 coupled between node 12 and server 10 is assigned message version 1.0. Although server 10 is capable of transmitting and receiving messages using message version 2.0, the server is also capable of communicating messages using earlier message versions (e.g., version 1.0, 1.1, and 1.2).

When initially configuring the system illustrated in FIG. 1, server 10 determines the message version associated with each of the multiple communication links coupled to the server. During this initial configuration, server 10 may automatically identify the message version associated with communication link 22. This automatic identification can be performed by transmitting a query to node 12 using various message versions supported by the server. One or more of the message versions will be properly received by node 12, which then returns a signal indicating the message version with which the node is configured to operate. Server 10 then configures communication link 22 and associates the particular message version identified by node 12 with communication link 22. Alternatively, a system administrator or other user of the communication system can manually configure server 10 to associate a particular message version with communication link 22. In this situation, the system administrator first identifies the message version associated with node 12 and assigns that same message version to communication link 22. Similar procedures are used to configure the other communication links coupled to server 10.

In a particular embodiment of the invention, the message version associated with a particular communication link, e.g., communication link 22, does not change on a regular basis. The software or communication version operating on node 12 changes infrequently (e.g., when the software or communication system is changed to implement a communication system using a different message version). When the message version used by node 12 is changed, the new message version associated with node 12 is also assigned to communication link 22 by changing the configuration information in server 10. As discussed above, this changing of the configuration information in server 10 may occur automatically (e.g., by an "update message" sent by node 12) or may be manually configured by a user of the system.

Although server 10 supports message version 2.0, it also supports previous message versions, which may differ from one communication link to the next. Thus, if a particular node is changed from version 1.2 to version 2.0, it is not necessary to change the message version of server 10 because the server already supports version 2.0.. Additionally, the message version of a particular node may be changed independently of the message versions associated with other nodes in the communication system. This configuration also allows server 10 to be changed from version 2.0 to a higher version (e.g., version 2.1 or 3.0) without changing the versions of nodes 12–20. In certain configurations, a node may have a higher (i.e., more recent) version than the server. In this situation, the communication link between the node and the server is assigned the version associated with the server, because the server does not support the version of the node.

Another node 14 is coupled to server 10 using communication link 24. As illustrated in FIG. 1, communication link 24 has an associated message version 1.2. Thus, node 14 contains software or communication systems that are capable of transmitting and receiving messages using message version 1.2. As discussed above, server 10 is configured to associate message version 1.2 with communication link 24.

Node 16 is coupled to server 10 using communication link 26 having an associated message version 1.1. Similarly, node 18 is coupled to server 10 using communication link 28 which has an associated message version 2.0.. Additionally, node 20 is coupled to server 10 using communication link 30 which has an associated message version 1.2. Server 10 is configured to associate the appropriate message versions with each of the communication links 26, 28, and 30 using the procedures discussed above. Communication links 22–30 may be any type of link, such as a serial, parallel, or network communication link.

Although FIG. 1 illustrates five nodes 12–20 coupled to server 10, it will be appreciated that any number of nodes may be coupled to a particular server. Server 10 can be any type of system capable of operating as a server, such as a personal computer (PC), mainframe, or any general purpose computer. In particular embodiments of the communication system shown in FIG. 1, multiple communication links may be provided between server 10 and a particular node.

Additionally, a particular server may support any number of message versions up to and including its own highest supported message version. In a particular embodiment of the invention, server 10 may support a limited range of message versions. For example, if a particular server currently supports a highest message version of 7.0, the server may limit its support of communication links to those using message version 5.0 and higher. Thus, the "backward compatibility" of the server is limited to a particular range of message versions.

Figure 2:
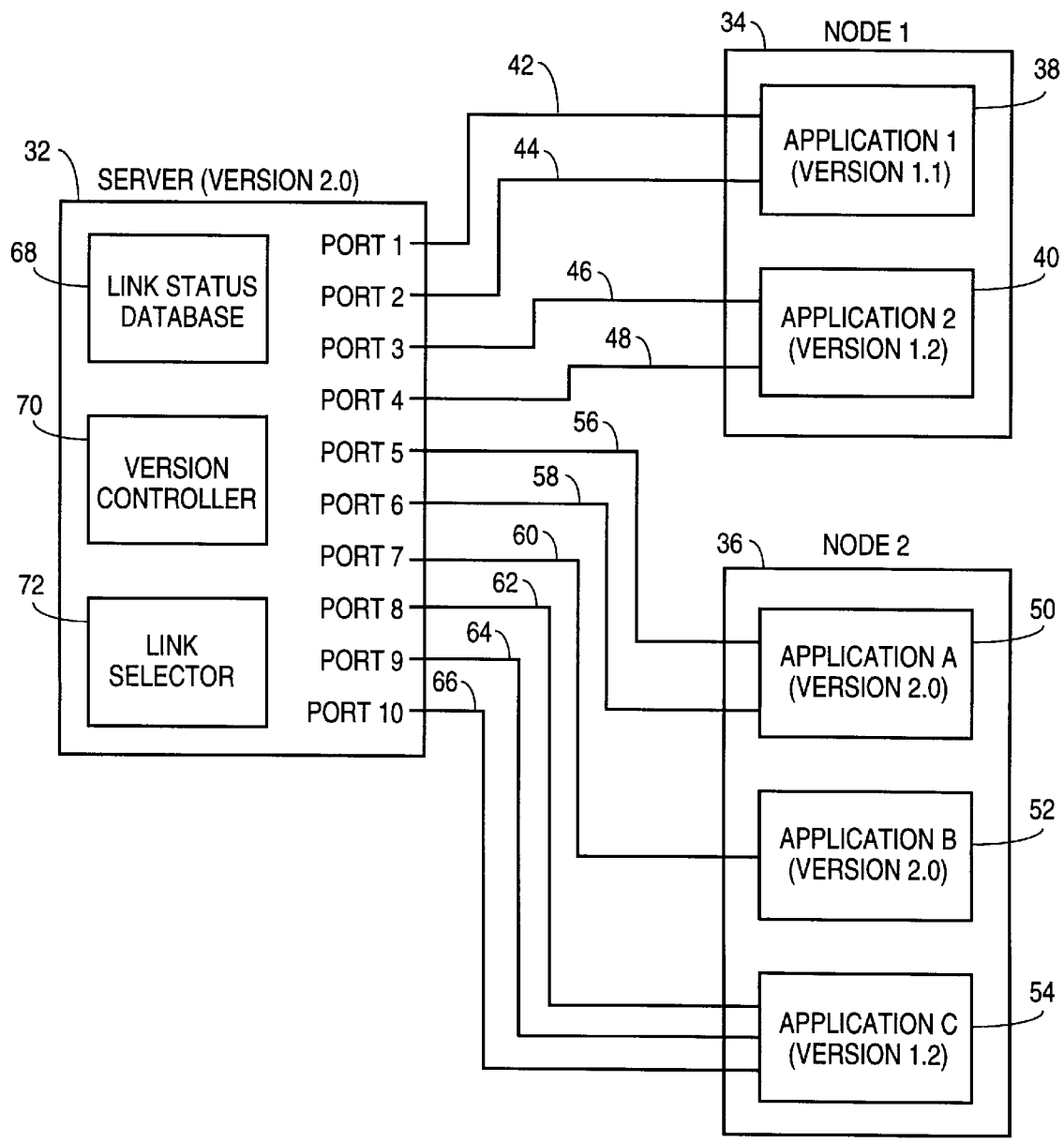
FIG. 2 illustrates another embodiment of a server coupled to a pair of nodes in which multiple communication links are provided between the server and each node.

FIG. 2 illustrates another embodiment of a server 32 coupled to a pair of nodes in which multiple communication links are provided between the server and each node. Server 32 is coupled to a first node 34 and a second node 36. Nodes 34 and 36 may also be referred to as "clients" or "client nodes." Node 34 includes a first application 38 and a second application 40. Application 38 is configured to transmit and receive messages using message version 1.1 and application 40 is configured to transmit and receive messages using message version 1.2. Two communication links 42 and 44 are coupled between server 32 and application 38. Application 40 is coupled to server 32 using a pair of communication links 46 and 48.

As shown in FIG. 2, server 32 is capable of transmitting and receiving messages using message version 2.0.. In a particular embodiment of the invention, server 32 is also capable of transmitting and receiving messages using previous message versions 1.1 and 1.2. Server 32 is shown having ten communication ports, in which each port is coupled to a particular communication link.

Node 36 contains three applications 50, 52, and 54. Application 50 and 52 are configured to transmit and receive messages using message version 2.0.. Application 54 is configured to transmit and receive messages using message version 1.2. Application 50 is coupled to server 32 using communication links 56 and 58. Application 52 is coupled to server 32 using a single communication link 60. Application 54 is coupled to server 32 using three communication links 62, 64, and 66.

As shown in FIG. 2, a particular application or node may have one or more communication links for communicating with server 32. Applications 38, 40, and 50 each have two communication links coupled to server 32. The use of two communication links provides increased bandwidth as well as a redundant communication link which provides a backup communication link in the event of a failure of one of the two communication links.

In a particular embodiment of the invention, communication links 42 and 44 are capable of transmitting data to application 38 as well as application 40. Similarly, communication links 46 and 48 are capable of transmitting data to application 40 and 38. For example, if both communication links 46 and 48 fail or experience heavy data flow, one or both of communication links 42 and 44 can be used by application 40 to communicate data between server 32 and application 40. In this example, the data is received by application 38 on communication link 42 or 44, and is forwarded or otherwise transmitted within node 34 to application 40. Although application 38 does not support message version 1.2 (supported by application 40), application 38 is capable of receiving and forwarding the data to application 40. Similarly, application 38 can receive data from application 40 in message version 1.2 and transmit that data to server 32 across communication link 42 or 44. Thus, the four communication links 42, 44, 46, and 48 coupled between node 34 and server 32 can be used to communicate data for either application 38, 40.

Similarly, the multiple communication links 56–66 coupled between server 32 and node 36 can be used to communicate data for any of the three applications 50, 52, and 54.

A particular embodiment of the invention provides for the assignment of a redundant (or backup) communication link to a particular primary communication link. For example, if application 38 uses communication link 42 as a primary communication link, communication link 44 may be specified as a redundant communication link. Similarly, application 38 may specify communication link 46 or 48 as a redundant communication link. Application 52 in node 36 has a single primary communication link 60 to server 32. In this case, one of the communication links associated with application 50 or 54 may be assigned as the redundant link for communication link 60.

Server 32 shown in FIG. 2 includes a link status database 68, a version controller 70, and a link selector 72. Link status database 68 maintains information about the various communication links coupled to server 32. For example, link status database 68 maintains the current configuration regarding the message version associated with each communication link. Version controller 70 controls the flow of information across the various communication links and ensures that the proper message version is used to transmit data across a particular communication link. Additionally, version controller 70 is capable of monitoring the message version of incoming signals received from a communication link to ensure that the messages conform to the message version assigned to the communication link. Link selector 72 is used to select a particular communication link for transmitting data from server 32 to node 34 or 36. Link selector 72 is capable of redirecting data across a redundant communication link if the primary communication link fails.

FIGS. 3A and 3B illustrate embodiments of a link status table containing information regarding various communication links in a communication system. The link status table is typically maintained by a server or similar device (e.g., server 10 in FIG. 1 or server 32 in FIG. 2). In the embodiment of FIG. 2, the link status table is maintained or stored within link status database 68 in server 32.

The link status table illustrated in FIG. 3A contains nine fields (columns) for storing data associated with each communication link. Field 76 identifies the port number that is associated with the particular communication link. For example, server 32 in FIG. 2 has port 1 associated with communication link 42 and port 2 associated with communication link 44. Field 78 identifies the message version associated with the link. Field 80 identifies one or more redundant links associated with the communication link. Field 82 provides a description of the communication link and field 84 identifies the type of physical media (e.g., an Ethernet link communicating using Transmission Control Protocol/Internet Protocol (TCP/IP)). The baud rate for the communication link is identified by field 86 and field 88 identifies the parity associated with the data transmitted across the communication link. Field 90 identifies the number of data bits used to transmit data across the communication link and field 92 identifies the number of stop bits associated with data communicated across the communication link.

The various information illustrated in FIG. 3A corresponds to the ten ports and communication links illustrated in FIG. 2. For example, port 1 has an associated message version 1.2, which corresponds with the message version of application 38. Port 1 also has a redundant communication link identified as communication link 2 (i.e., port 2 on server 32). In this particular example of the link status table, port 7 does not have an assigned redundant link. However, as discussed above, any of the other communication links coupled to node 36 may be assigned as a redundant link to communication link 60. Additionally, ports 8, 9, and 10 each have two separate redundant links. In this situation, the redundant links may have equal priority, or the first listed redundant link may have a higher priority such that it is used before the second listed redundant link.

In another embodiment of the invention, instead of providing two redundant links for a particular link, each primary link has a single redundant link. If a failure in the primary link occurs, the backup link is used. If the backup link fails, then the backup link associated with the first backup link is used. Thus, multiple backup links may be provided, but only a single backup link is associated with each primary link.

FIG. 3B illustrates another embodiment of the link status table, again corresponding to the ten ports and communication links illustrated in FIG. 2. The table of FIG. 3B has a different assignment of redundant links. For example, port 1 has two associated redundant links (3 and 4) and port 7 has three associated redundant links (5, 8, and 10). In this link status table, the redundant links are not necessarily coupled to the same application as the primary link. Additionally, the redundant links may have a different associated message version than the primary link with which the redundant link is associated. For example, port 2 has and associated message version 1.1, which corresponds to application 38. The two redundant links associated with port 2 (i.e., ports 4 and 3) have an associated message version 1.2, which differs from the message version associated with port 2.

Figure 4:
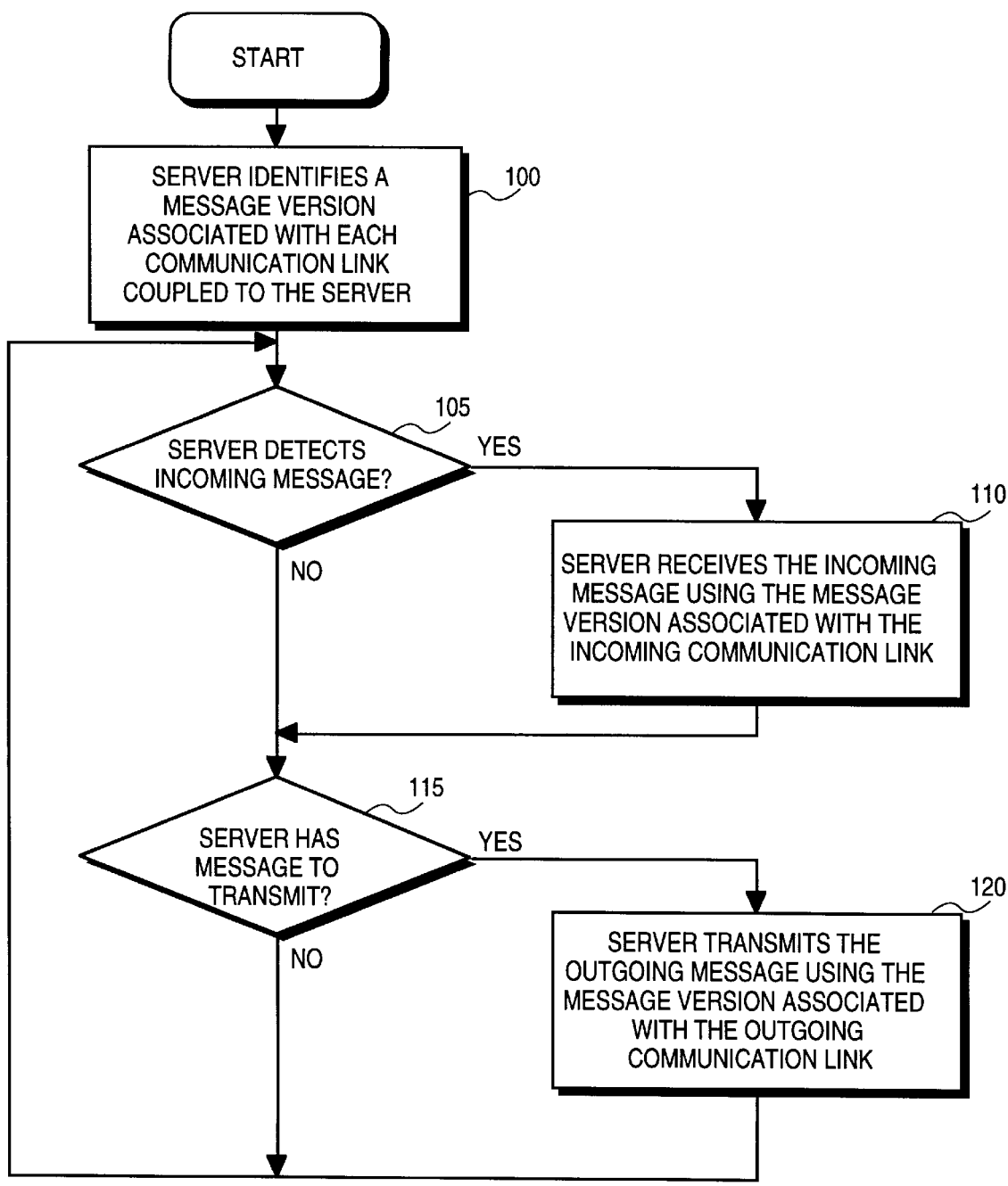
FIG. 4 is a flow diagram illustrating an embodiment of a procedure for communicating messages between a server and a node.

FIG. 4 is a flow diagram illustrating an embodiment of a procedure for communicating messages between a server and a node. At step 100, the server identifies a message version associated with each communication link coupled to the server. This identification can be performed by consulting, for example, a link status table of the type illustrated in FIGS. 3A and 3B. At step 105, the server determines whether an incoming message has been detected on any of the communication links. As discussed above, the server is capable of receiving messages in any one of multiple message versions. If step 105 does not detect an incoming message, then the procedure continues to step 115. If an incoming message is detected at step 105, then the procedure branches to step 110 where the server receives the incoming message using the message version associated with the incoming communication link.

In a particular embodiment of the invention, the server adds information to the received message indicating the message version associated with the received message. Alternatively, the server may add information to the received message indicating the port number on which the message was received. Based on this port number, other devices and components (including software modules) within the server can consult a lookup table to determine the message version associated with the port number. The various devices and components within the server may process the message differently based on the message version associated with the message. For example, a software module may support several versions of a "Save" message. The manner in which the software module executes a particular "Save" message varies with the message version. The software module may limit the operation of the "Save" message to the associated message version, even though the software module is capable of supporting other versions of the message. If an unsupported message (or unsupported message attribute) for the particular message version is identified by the software module, then the message is discarded and an error is logged or reported to the system. Additionally, an error message may be sent to the originating host identifying the error. Each component or module within the server is capable of handling all message versions supported by the server.

In a particular embodiment of the invention, each device coupled to a communication link contains an algorithm or other mechanism for packing and unpacking message data communicated across the communication link. These algorithms identify the version number of the message, which is transmitted with the message. Based on the identified message version, the packing or unpacking algorithm packs or unpacks the message using the format associated with the message version. For example, if a message is being assembled, all message information that is not supported by the associated message version is removed before the message is assembled. After the message is assembled, the message is communicated to the appropriate application (or applications) for processing the message.

The applications that support multiple message versions process the messages differently depending on the associated message version. Initially, the application may verify that the associated message version is supported by the application. If so, the application accepts the message for processing. Otherwise, the application may reject the message and generate an appropriate error message. The application may use, for example, multiple routines (or subroutines) to handle the multiple message versions. Various conditional statements can be used to select the proper message processing based on the message version. If there is no change in the functionality between several message versions, those versions may be handled by the application in the same manner. For example, if version 2.0 and 2.1 have the same functionality for a particular application, the application does not need to distinguish between the two versions, and can treat them as the same version.

At step 115 of FIG. 4, the server determines whether it has a message for transmission to a node across a communication link. As mentioned above, the server is capable of transmitting messages in any one of multiple message versions. If the server does not have any messages to transmit, then the procedure returns to step 105 to test for an incoming message. If the server has an outgoing message to transmit, then the procedure branches to step 120 where the server transmits the outgoing message using the message version associated with the outgoing communication link. The procedure then returns to step 105 to test for an incoming message. Thus, the server repeatedly checks for incoming and outgoing messages, and processes the messages accordingly.

Figure 5:
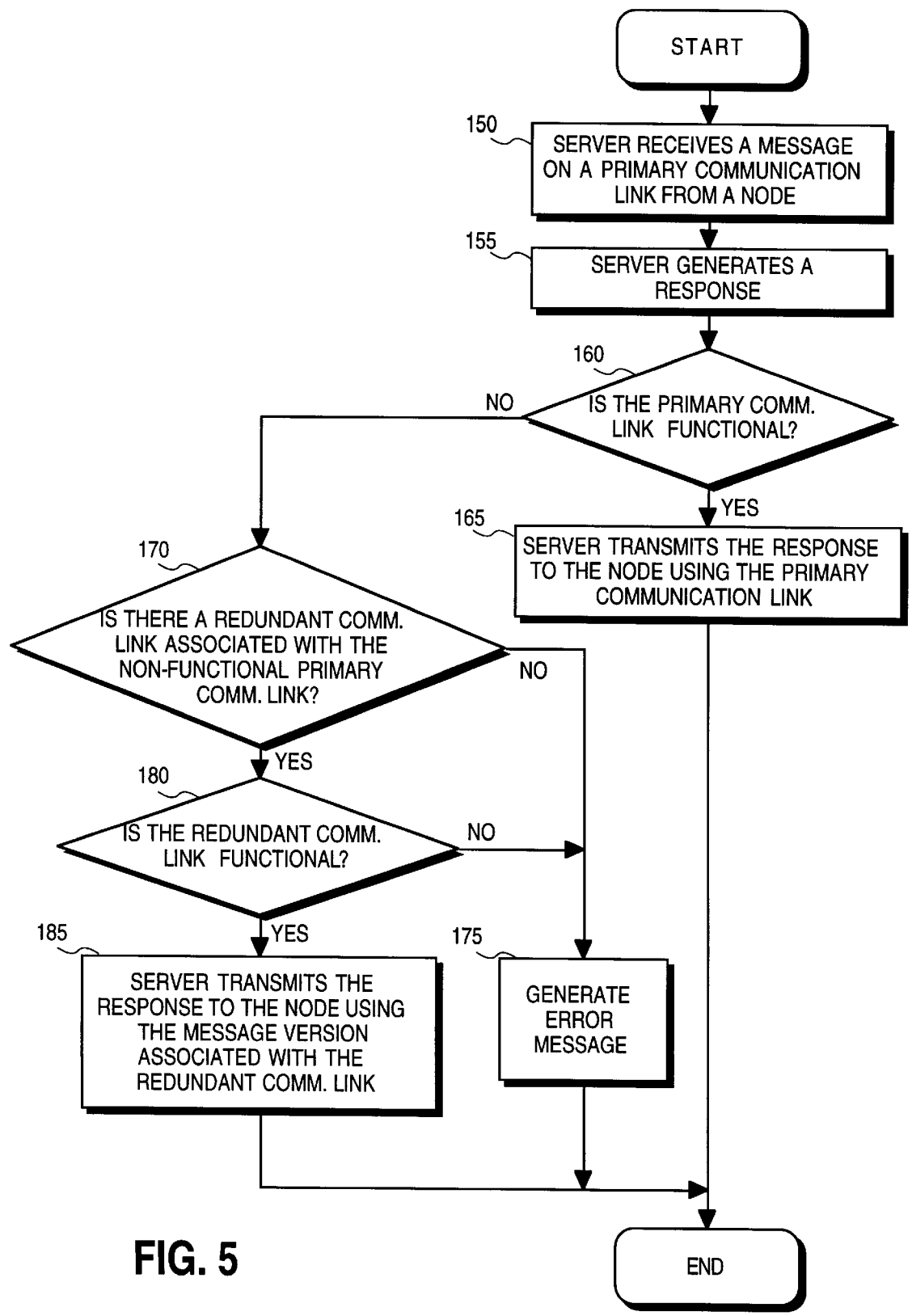
FIG. 5 is a flow diagram illustrating an embodiment of a procedure for selecting a redundant communication link for communicating messages between a server and a node.

FIG. 5 is a flow diagram illustrating an embodiment of a procedure for selecting a redundant communication link for communicating messages between a server and a node. At step 150, a server receives a message on a primary communication link from a node. At step 155, the server generates a response message for transmission to the node. Step 160 determines whether the primary communication link (on which the original message was received at step 150) remains functional. If the primary communication link is functional, then step 165 transmits the response from the server to the node using the primary communication link. The server transmits the response using the message version associated with the primary communication link.

If the primary communication link is not functional at step 160, then the procedure branches to step 170 to determine whether there is a redundant communication link associated with the non-functional primary communication link. As discussed above, a link status table of the type shown in FIGS. 3A and 3B may be used to identify redundant communication links. If no redundant communication link is provided, then the procedure branches to step 175 to generate an error message indicating that the primary communication link failed. The error message can be provided to various modules and devices in the server or any nodes or devices coupled to the server.

If a redundant communication link is identified at step 170, then the procedure determines whether the redundant communication link is functional at step 180. If the redundant communication link is not functional, the procedure branches to step 175 to generate an error message indicating the failure of the primary and redundant communication link. If the redundant communication link is functional, then the server transmits the response to the node using the redundant communication link. The message is transmitted using the message version associated with the redundant communication link.

If multiple redundant communication links are identified at step 170, then each redundant link is tested at step 180. If all redundant communication links are non-functional, then the error message is generated at step 175. If a functional redundant communication link is identified at step 180, then that link is used to transmit the response in step 185.

Figure 6:
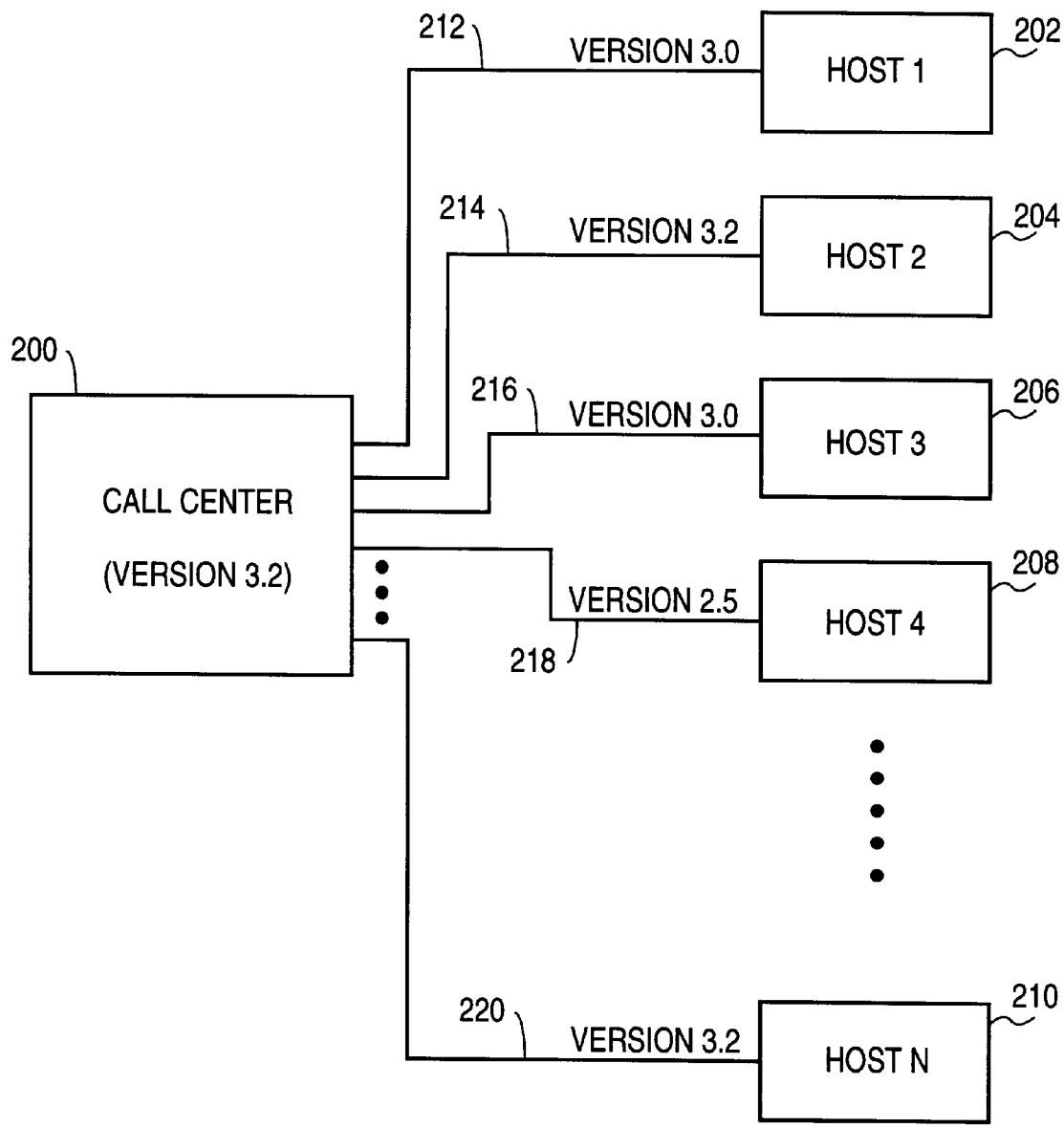
FIG. 6 illustrates a particular embodiment of the invention implemented using a call center coupled to multiple hosts.

FIG. 6 illustrates a particular embodiment of the invention implemented using a call center 200 coupled to multiple hosts. Call center 200 may be any type of system capable of receiving, processing, routing, transmitting, or otherwise handling telephone calls, video calls, electronic mail, facsimiles, network sessions (e.g., sessions across the internet), or other transactions. A particular type of call center may be referred to as an automated call distributor (ACD).

The various hosts illustrated in FIG. 6 may be any type of system capable of being coupled to a call center, such as a processor-based system. A particular host may execute one or more application programs that, for example, process information regarding caller account information, sales information, or the service history of a caller. Although not shown in FIG. 6, multiple agents may be coupled to hosts 202–210. These agents are capable of initiating, receiving, and processing various types of calls, electronic mail, facsimiles, and other transactions. Information (such as account information regarding a caller) may be provided to an agent by a host in response to an incoming call or other transaction.

Call center 200 is coupled to multiple hosts 202, 204, 206, 208, and 210. Call center 200 supports message version 3.2 as well as previous message versions (e.g., versions 2.5 and 3.0). Communication link 218 has an associated message version 2.5, communication links 212 and 216 have an associated message version 3.0, and communication links 214 and 220 have an associated message version 3.2. Although not shown in FIG. 6, multiple communication links can be coupled between call center 200 and a particular host 202–210. Additionally, one or more redundant links can be associated with each communication link 212–220.

Although call center 200 supports message version 3.2, it also supports previous message versions, which may differ from one communication link to the next. Thus, if a particular host is changed from version 3.0 to version 3.2, it is not necessary to change the message version of call center 200 because the call center already supports version 3.2.

Additionally, the message version of a particular host may be changed independently of the message versions associated with other hosts in the system. This configuration also allows call center 200 to be changed from version 3.2 to a higher version (e.g., version 3.3 or 4.0) without changing the versions of hosts 202–210.

Figure 7:
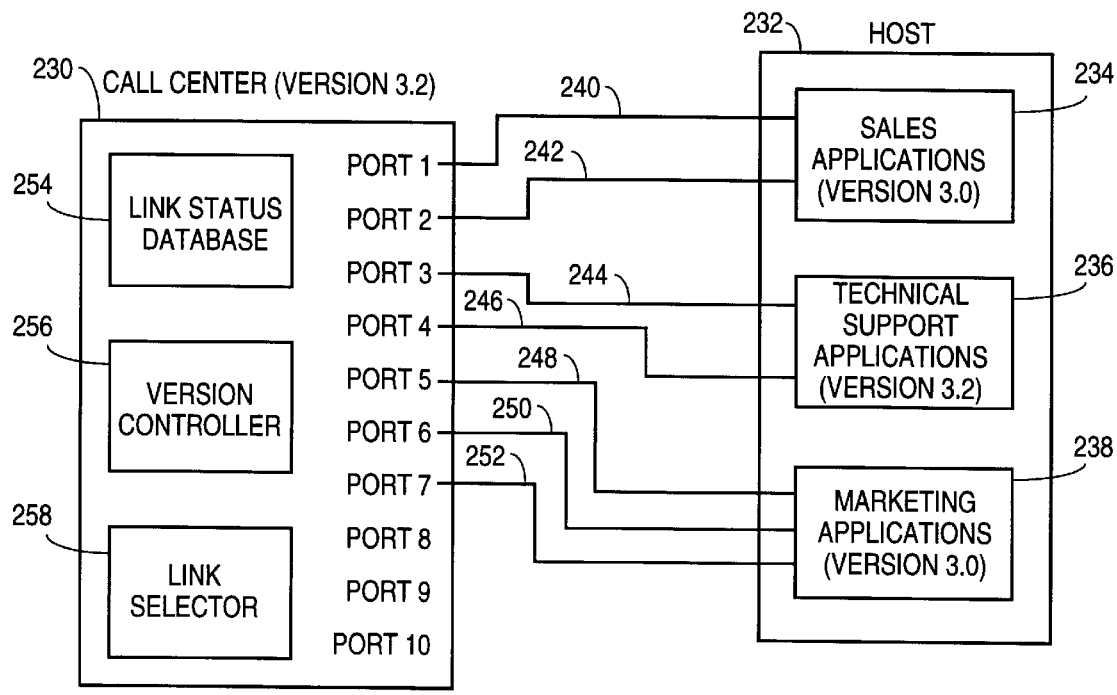
FIG. 7 illustrates an embodiment of a call center coupled to a single host in which the host includes multiple applications.

FIG. 7 illustrates an embodiment of a call center 230 coupled to a single host 232 in which the host includes multiple applications. Host 232 includes sales applications 234, technical support applications 236, and marketing applications 238. As mentioned above, these applications 234, 236, and 238 can provide information (such as account information or service history) for a particular caller. Various communication links 240–252 are coupled between call center 230 and host 232. Call center 230 supports message version 3.2 as well as previous message versions 3.0 and 3.1. Sales applications 234 and marketing applications 238 transmit and receive messages using message version 3.0. Technical support applications 236 transmit and receive messages using message version 3.2. Each communication link 240–252 has an associated message version that corresponds to the message version of the application to which the communication link is coupled. For example, communication links 240, 242, 248, 250, and 252 have an associated message version 3.0.

Call center 230 includes a link status database 254, a version controller 256, and a link selector 258. Link status database 254 maintains information regarding the various links coupled to call center 230. For example, link status database 254 maintains the current configuration regarding the message version associated with each communication link. Version controller 256 controls the flow of messages across the various communication links and ensures that the proper message version is used to transmit data across a particular communication link. Link selector 258 is used to select a particular communication link for transmitting data from call center 230 to host 232. Link selector 258 can monitor the flow of messages across communication links 240–252 and reroute messages to different communication links as necessary. Link selector 258 is also capable of rerouting messages to redundant communication links if a primary communication link fails. The operation of the system shown in FIG. 7 is similar to the systems discussed above with respect to FIGS. 1–5.

Figure 8:
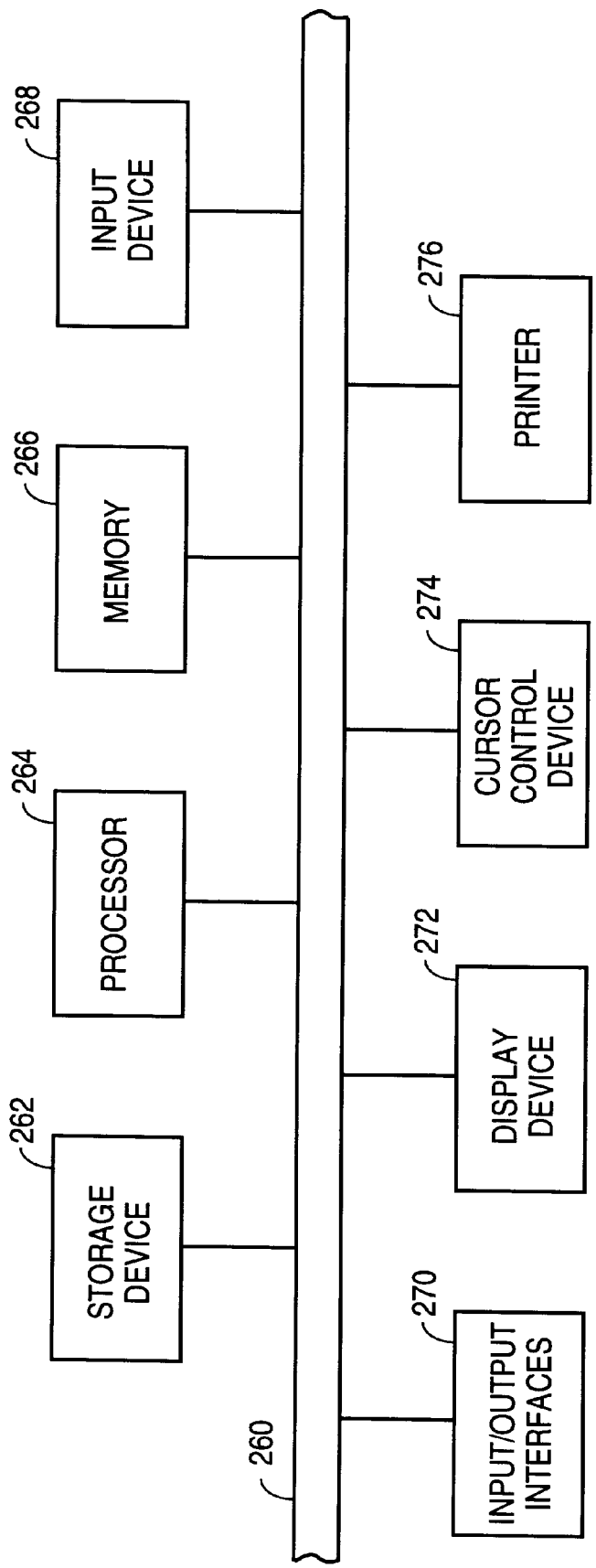
FIG. 8 illustrates an embodiment of a processor-based system capable of implementing the teachings of the present invention.

FIG. 8 illustrates an embodiment of a processor-based system capable of implementing the teachings of the present invention. A storage device 262 and a processor 264 are coupled to a bus 260. Storage device 262 may be any type of storage device, including a magnetic storage device or an optical storage device. Similarly, processor 264 may be any type of processor or central processing unit (CPU). A memory 266 is coupled to bus 260. Memory 266 may include various types of memory, such as random access memory (RAM), read-only memory (ROM), cache memory, and other memory storage devices. An input device 268 is also coupled to bus 260 and provides a mechanism for a user to communicate with the system. Input device 268 may include a keyboard or any other mechanism capable of inputting information into the processor-based system.

One or more input/output interfaces 270 are coupled to bus 260 and permit the communication of information to or from external devices coupled to interface 270. Interface 270 allows these external devices to communicate with processor 264 and the other components of the processor-based system shown in FIG. 8. A display device 272 and a cursor control device 274 are coupled to bus 260. Cursor control device 274 may include a mouse, light pen, or other device capable of controlling a cursor's position. A printer 276 is also coupled to bus 260 and is capable of producing a hard copy of information stored in or generated by the processor-based system.

Although FIG. 8 illustrates various system components coupled to a single bus 260, it will be appreciated that a particular processor-based system may include multiple buses and multiple communication links between various components of the system. Additionally, a particular system may have additional components or fewer components, based on the particular application of the system. For example, a particular system may include multiple processors.

Embodiments of the present invention may include code sequences, instructions, parameters, and other information stored on a processor-readable medium (or computer-readable medium). The code sequences, instructions, parameters, and other information are used to perform various data processing and data management operations, such as the procedures described above. The processor-readable medium may be any type of magnetic, optical, or electrical storage medium including a disk, diskette, CD-ROM, memory device, or similar storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A message-based communication system comprising:
   a first communication link having an associated message version;
   a first device coupled to the first communication link, wherein the first device is to communicate messages across the first communication link using the message version associated with the first communication link;
   a second device coupled to the first communication link, wherein the second device is to communicate messages across the communication link using any of the plurality of message versions and wherein the second device includes a link status database to store status information regarding communications links coupled to the second device; and
   a second communication link that is configured as a redundant communication link between the first device and the second device,
   wherein a message version associated with the second communication link differs from the message version associated with the first communication link.

2. The message-based communication system of claim 1 further including a message version controller coupled to the communication link.

3. The message-based communication system of claim 1 wherein the second device is coupled to a plurality of communication links, and wherein each communication link is associated with one of a plurality of message versions.

4. The message-based communication system of claim 1 wherein the first device is a client node and the second device is a server.

5. The message-based communication system of claim 1 wherein the first device is a host and the second device is a call center.

6. An apparatus for communicating messages across a plurality of communication links, the apparatus comprising:
   a communication device coupled to the plurality of communication links including first and second communication links, the second communication link comprising a redundant communication link for the first communication link, wherein the communication device is to communicate messages across each communication link, and wherein each communication link has one of a plurality of associated message versions; and
   a link status database coupled to the communication device, wherein the link status database is to store information regarding the message version associated with each communication link coupled to the communication device,
   wherein a message version associated with the second communication link differs from a message version associated with the first communication link.

7. The apparatus of claim 6 wherein the communication device includes a message version controller coupled to each communication link.

8. The apparatus of claim 6 wherein the communication device is a server.

9. The apparatus of claim 6 wherein the communication device is a call center.

10. A message-based communication system comprising:
    a primary communication link having an associated message version;
    a first device coupled to the primary communication link, wherein the first device is to communicate messages across the primary communication link using the message version associated with the primary communication link;
    a second device coupled to the primary communication link, wherein the second device is to communicate messages across the primary communication link and is to communicate messages in a plurality of message versions and wherein the second device includes a link status database to store status information regarding communications links coupled to the second device; and
    a redundant communication link coupled to the first device and the second device, wherein the redundant communication link has an associated message version that differs from the message version associated with the primary communication link.

11. The message-based communication system of claim 10 further including a message version controller coupled to the primary communication link and the redundant communication link.

12. The message-based communication system of claim 10 wherein the first device is a client node and the second device is a server.

13. The message-based communication system of claim 10 wherein the first device is a host and the second device is a call center.

14. A method for communicating a message between a first device and a second device, the method comprising:
    receiving the message at the second device, wherein the message was generated by the first device and communicated from the first device to the second device using a primary communication link, and wherein the message was communicated using a message version associated with the primary communication link;
    the second device generating a response to the received message;

the second device transmitting the response to the first device using the primary communication link if the primary communication link is functional, wherein the response is transmitted using the message version associated with the primary communication link; and the second device identifying a redundant communication link associated with the primary communication link and transmitting the response to the first device using the redundant communication link if the primary communication link is not functional, wherein the response is transmitted using a message version associated with the redundant communication link, wherein the message version associated with the primary communication link differs from the message version associated with the redundant communication link.

* * * * *